United States Patent Office 3,641,090
Patented Feb. 8, 1972

3,641,090
SILANOLATE-COMPLEXES AND USE THEREOF
Edgar E. Bostick, Scotia, and Joseph J. Zdaniewski, Schenectady, N.Y., assignors to General Electric Company
No Drawing. Filed Oct. 13, 1969, Ser. No. 866,003
Int. Cl. C07f 7/02
U.S. Cl. 260—448.2 N  3 Claims

ABSTRACT OF THE DISCLOSURE

Hexamethylphosphoramide-complexes of alkali metal silanolates are provided, and a method for making these materials. These alkali metal silanolate-complexes can be used as polymerization initiators for the preparation of organopolysiloxanes and organopolysiloxane block polymers.

The present invention relates to hexamethylphosphoramide-complexes of alkali metal silanolates.

The hexamethylphosphoramide-complexes of alkali metal silanolates included by the present invention, hereinafter referred to as the "silanolate-complexes" have the formula, (1)

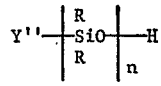

where Y is selected from R and HMPA·MO—, R is a member selected from monovalent hydrocarbon radicals, halogenated monovalent hydrocarbon radicals, and cyanoalkyl radicals, Z is an alkali metal, HMPA is hexamethylphosphoramide, and $n$ is an integer having a value of from 1 to 4 inclusive.

Radicals included by R of Formula 1 are aryl radicals and halogenated aryl radicals, such as phenyl, chlorophenyl, xylyl, tolyl, etc.; alkyl radicals such as methyl, ethyl, propyl, chloromethyl, butyl, etc.; cycloalkyl radicals such as cyclohexyl, cycloheptyl, etc. Cyanoalkyl radicals such as β-cyanoethyl, γ-cyanopropyl, δ-cyanobutyl, etc. Where R can be more than one radical R can be the same or different. Metals included by Z are, for example, lithium, sodium, potassium, cesium and rubidium.

The silanolate-complexes of the present invention can be made by effecting contact between hexamethylphosphoramide and an alkali metal silanolate of the formula, (2)

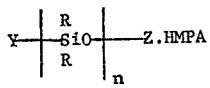

where R, M and $n$ are as previously defined, and Y' is selected from R and OZ, at temperatures in the range of from 0° C. to 100° C. The silanolate-complexes are crystalline materials and can have sharp melting points. For example the silanolate-complex of dilithium tetraphenyldisiloxanediolate melts at a temperature of 169° C. to 161° C. The silanolate-complex of lithium triphenyl silanolate melts at 144.5° C. to 145.5° C. Also included by Formula 1 are hexamethylphosphoramide-complexes of potassium triphenylsilanolate, disodiumtetraphenyldisiloxanediolate, dilithium-1,3,5-7-tetramethyl - 1,3,5,7-tetraphenyltetrasiloxanediolate, dilithiumoctaphenyltetrasiloxanediolate, dilithium-1,3-dimethyl-1,3-β-cyanoethyldisiloxanediolate, etc.

The alkali metal silanolates of Formula 2 are well-known materials and can be made by effecting contact between an alkali metal or alkali metal compound and a silanol terminated organosilicon material of the formula, (3)

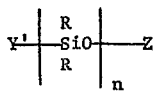

where R and $n$ are previously defined, and Y" is selected from R and OH. Among the alkali metals, there are included lithium, sodium, potassium, etc., or amalgams thereof. There are included by the term alkali metal compound, alkali metal hydroxide, for example, lithium hydroxide, sodium hydroxide, potassium hydroxide, etc., alkali metal alkoxides, such as sodium methoxide, potassium methoxide, lithium methoxide, etc., organoalkali metal compounds such as alkyl lithium, for example, butyl lithium, phenyl lithium, etc.

Generally, the alkali metal silanolate can be made by forming a mixture of the silanol terminated organosilicon material of Formula 3, and the alkali metal or the alkali metal compound in the presence of an organic solvent. A slurry of the silanolate generally forms. The slurry can be stripped of solvent. The stripped product thereafter can be used in the preparation of the silanolate-complex by contacting it with hexamethylphosphoramide in accordance with the practice of the invention. Suitable organic solvents which can be used for preparing the alkali metal silanolate of Formula 2 are, for example, benzene, hexane, tetrahydro furan, etc.

Included by the silanol containing organosilicon materials of Formula 3 are, for example, triphenylsilanol; tetraphenyl-1,3-siloxanediol; 1,3 - dimethyl, 1,3-diphenylsiloxanediol; octamethyl, 1,7-tetrasiloxanediol; 1,3,5,7-tetramethyl-1,3,5,7-tetra-β-cyanoethyl - 1,7 - tetrasiloxanediol, etc.

In preparing the silanolate-complexes, the alkali metal silanolate, a slurry thereof in a suitable organic solvent, is mixed with hexamethylphosphoramide until the alkali metal silanolate goes into solution. Temperatures in the range of from 0° C. to 100° C. and preferably temperatures up to 50° C. can be employed during dissolution. The silanolate-complex then can be precipitated from the solution by the addition of a solvent in which the silanolate-complex is insoluble. Suitable precipitating solvents are, for example, n-pentane, n-hexane, n-heptane, n-octane, 2-methylpentane, 3-methylpentane, or mixtures thereof. Separation of the silanolate-complex can be effected when a sufficient amount of the precipitating solvent is added to impart a cloudy appearance to the alkali metal silanolate-hexamethylphosphoramide solution. Crystallization of the silanolate-complex can be effected by standard techniques, such as by solvent evaporation, seeding the mother liquor with a crystal of the complex, etc. The final recovery of the silanolate-complex can be achieved by decanting, filtration, etc., followed by washing of the crystals.

The silanolate-complexes of the present invention can be employed as polymerization catalysts for diorganocyclopolysiloxane such as hexamethylcyclotrisiloxane, octamethylcyclotetrasiloxane, etc., or in the preparation of polydiorganosiloxane block copolymers as disclosed in copending application of Bostick and Fessler, Ser. No. 866,002, filed Oct. 13, 1969 and now U.S. Pat. No. 3,578,-726. In addition, the silanolate-complexes of the present invention can be used in combination with reinforcing silica fillers, such as fume silica, to impart improved bonding characteristics to the filler particles by solution treating the filler with the silanolate-complex, followed by slurring the treated filler in a polymerizable cyclopolydiorganosiloxane such as hexamethylcyclotetrasiloxane followed by baking the product. The treated filler then can be employed to reinforce diorganopolysiloxane gums.

In order that those skilled in the art will be better able to practice the invention, the following example are given by way of illustration and not by way of limitation. All parts are by weight.

EXAMPLE 1

There was added under a nitrogen atmosphere about 2.1 moles of n-butyllithium dissolved in hexane to 1 mole of tetraphenyldisiloxanediol dissolved in dry benzene. The addition of the n-btuyllithium was completed after about 45 minutes, while the resulting mixture was maintained at a temperature of 35° C. by means of external cooling. Excess dry hexane was added to mixture to induce precipitation of reaction product. A quantitative yield of a light solid was obtained which was washed several times with hexane. The solid was then dissolved in dry benzene and filtered through a glass frit. The product was found to have a molecular weight of 414 when titrated with 0.1 normal HCl. Based on method of preparation, the product was dilithiotetraphenyldisiloxanediolate.

There was added at about 25° C. about 60 parts of freshly distilled hexamethylphosphoramide to a solution of 30 parts of the above dilithiotetraphenyldisiloxanediolate dissolved in about 100 parts of benzene. Dry hexane was then added to the mixture until a permanent cloud was produced. The mixture was then heated to redissolve the precipitated product. The resulting solution was then allowed to cool to room temperature. A quantitative yield of fine crystals formed in about an hour. The crystals were collected on a glass frit and were washed in benzene and hexane. A small sample of the crystals was titrated with 0.1 N HCl to a phenolphthalein end point after the crystals were pumped under high vacuum for 12 hours. An equivalent weight of 397 was obtained, while the calculated equivalent weight for the corresponding theoretical silanolate-complex is 392. NMR indicated a methyl methyl to phenyl ratio of 1.81 as compared to 1.80, the calculated theoretical ratio. The recrystallized-complex had a melting point in the range of 169–171° C. Based on method of preparation, the product had the following formula,

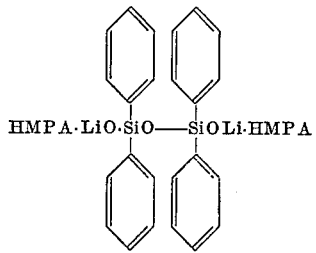

A solution of 0.1318 part of the above silanolate-complex was dissolved in about 10 parts of dry benzene. There was added 6.1 parts of the solution to 10 parts of dry benzene. There was added 6.1 parts of the solution to 10 parts of hexamethylcyclotrisiloxane dissolved in about 5 parts of dry benzene. The resulting mixture was stirred at room temperature for about 12 hours. There was then added about 10 parts of hexaphenylcyclotrissiloxane together with 20 parts of dry freshly distilled o-dichlorobenzene to the mixture. The resulting mixture was then gradually heated to a temperature of 185° C. over a two-hour period. During this heating period, the mixture was constantly stirred and a nitrogen stream was blown across the surface of the mixture to effect the removal of benzene. The temperature of the mixture was maintained at 185° C. for a total of four hours. A few drops of glacial acetic acid were then added to the mixture to terminate the polymerization. The resulting solid was added to excess methanol and heated on a steam bath for about an hour to extract the o-dichlorobenzene. The solid was extracted two additional times with fresh methanol following the same procedure. The solid was then collected on a filter and dried in a vacuum oven at 80° C. at 20 mm. for 12 hours. There was obtained an 85 percent yield of product having an intrinsic viscosity of 0.98 dl./gms. in o-dichlorobenzene at 120° C. Based on method of preparation, the product was a polydiphenylsiloxanepolydimethylsiloxanepolydiphenylsiloxane block copolymer having a molecular weight of about $1.76 \times 10^5$.

EXAMPLE 2

A solution of 0.35 mole of butyllithium in about 25 parts of hexane was added to a solution of 0.32 mole of triphenylsilanol in about 70 parts of benzene. After stirring the resulting solution for about two hours, it was stripped to ⅕ of its original volume. There was then added about 3½ volumes of hexane to the mixture and the resulting solution was then evaporated to the original volume. The addition of hexane equal to 3½ times the volume of the solution was repeated. A white solid was removed by filtration and dried. Based on method of preparation, there was obtained a quantitative yield of lithiumtriphenyl-silanolate.

There was added about 5 parts of hexamethylphosphoramide to about 10 parts of the above-prepared lithiumtriphenyl-silanolate suspended in about 50 parts of benzene. The resulting solution was filtered. There was then added 50 parts of hexane to the filtrate. The solution was allowed to cool slowly to room temperature. A white crystalline solid formed which was recovered by filtration. The solid was recrystallized from a benzene-hexane solvent mixture. Based on titration with a 0.1 N HCl solution to determine its silanolate equivalent weight, and its method of preparation, the solid was hexamethylphosphoramidolithiumtriphenyl-silanolate. Its melting point was 144.5–146.5° C.

Although the above examples are limited to only a few of the very many silanolate-complexes included within the scope of the present invention, it should be understood that the present invention is broadly directed to silanolate-complexes included by Formula 1 which can be made by effecting contact between hexamethylphosphoramide and an alkali metal silanolate of Formula 2.

What is claimed is:

1. A silanolate-complex of the formula,

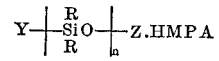

where R is a member selected from monovalent aryl radicals, halogenated monovalent aryl radicals and cyanoalkyl radicals, Z is an alkali metal, Y is selected from R and HMPA.OZ, $n$ is a positive integer having a value of from 1 to 4 inclusive, and HMPA is hexamethylphosphoramide.

2. A hexamethylphosphoramide complex of dilithiotetraphenyldisiloxanediolate, in accordance with claim 1.

3. A hexamethylphosphoramide-complex of lithiumtriphenyl-silanolate, in accordance with claim 1.

References Cited

UNITED STATES PATENTS

| | | | |
|---|---|---|---|
| 3,203,923 | 8/1965 | Fekete | 260—448.2 N |
| 3,203,924 | 8/1965 | Fekete | 260—448.2 N |
| 3,203,925 | 8/1965 | Fekete | 260—448.2 N |
| 3,346,492 | 10/1967 | Hess | 260—448.2 N |
| 3,536,718 | 10/1970 | Selin | 260—448.2 N |

TOBIAS E. LEVOW, Primary Examiner

W. F. W. BELLAMY, Assistant Examiner

U.S. Cl. X.R.

252—431